(12) United States Patent
Yoshida

(10) Patent No.: US 6,798,988 B2
(45) Date of Patent: Sep. 28, 2004

(54) RANGEFINDER APPARATUS AND CAMERA EQUIPPED THEREWITH

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/670,789

(22) Filed: Sep. 26, 2003

(65) Prior Publication Data

US 2004/0081444 A1 Apr. 29, 2004

(30) Foreign Application Priority Data

Sep. 27, 2002 (JP) .................................... P2002-284054

(51) Int. Cl.⁷ .............................................. G03B 13/36
(52) U.S. Cl. ...................... 396/104; 396/128; 356/3.14; 250/201.8
(58) Field of Search ................................ 396/104, 125, 396/128, 147; 356/3.13–3.16; 346/4.01, 4.04; 250/201.2, 201.6, 201.7, 201.8

(56) References Cited

U.S. PATENT DOCUMENTS

| | | |
|---|---|---|
| 5,561,497 A | 10/1996 | Muramatsu et al. |
| 5,930,532 A * | 7/1999 | Matsumoto ................... 396/95 |
| 5,960,219 A * | 9/1999 | Kageyama et al. ......... 396/104 |

FOREIGN PATENT DOCUMENTS

JP   A2 01-179115   10/1997

* cited by examiner

Primary Examiner—W. B. Perkey
(74) Attorney, Agent, or Firm—Leydig, Voit & Mayer, Ltd.

(57) ABSTRACT

A rangefinder apparatus includes an autofocus (AF) data generator; an AF data acquiring unit; an interpolated correlation extreme value computer for detecting at least one correlation extreme value from computed correlation values, and interpolating to compute the interpolated correlation extreme value(s); a highest correlation value detector for detecting a highest correlation value exhibiting the highest correlation according to the interpolated correlation extreme value(s); a shift amount computer for computing the shift amount of a window area yielding the highest correlation value; a rangefinding error detector for determining the validity of the computed shift amount depending on whether the shift amount computed is outside a predetermined range; and an object distance calculator for calculating the distance to an object according to the shift amount.

2 Claims, 12 Drawing Sheets

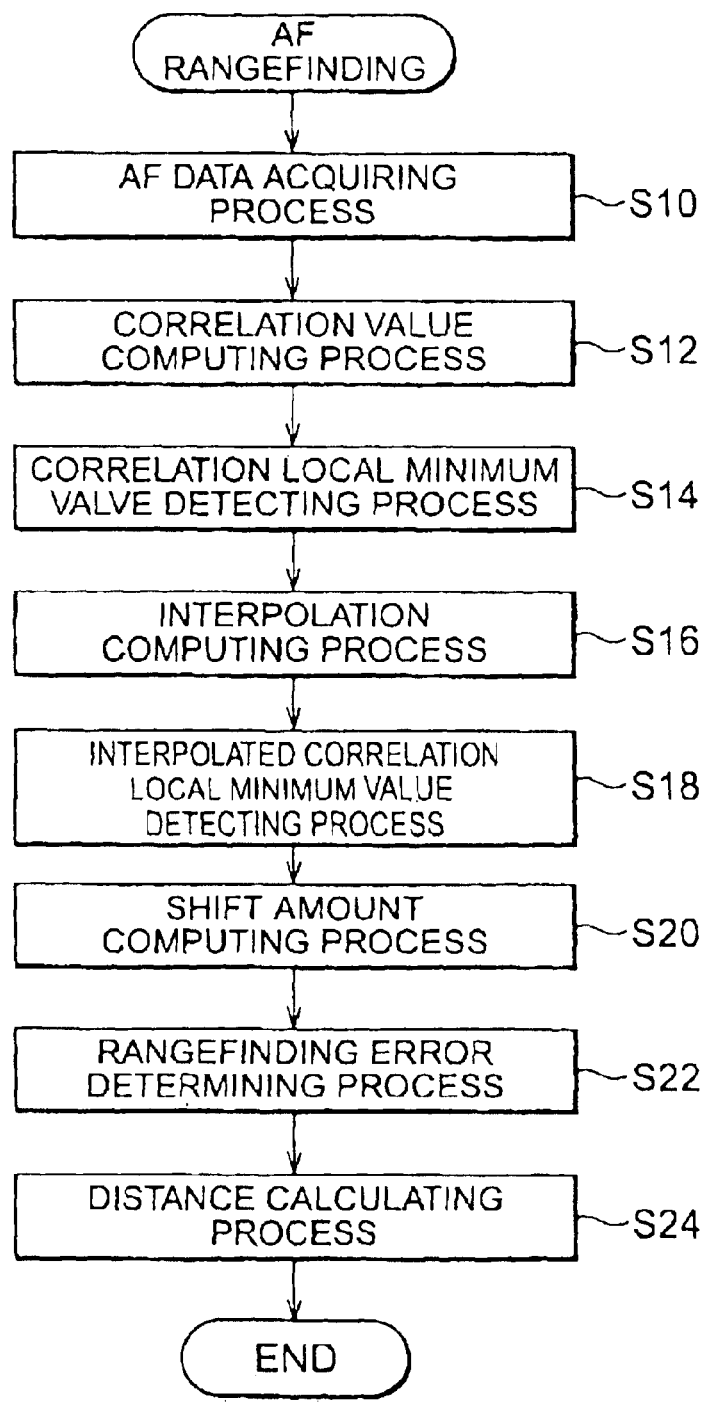

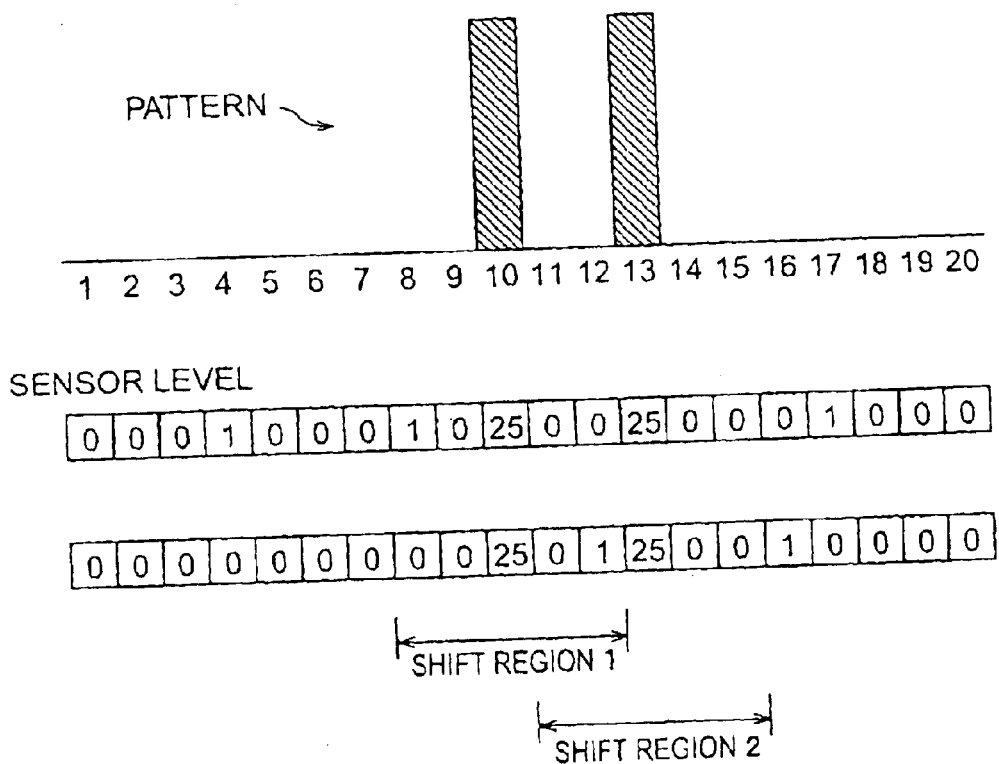

RANGEFINDER APPARATUS AND CAMERA EQUIPPED THEREWITH

BACKGROUND OF THE INVENTION

1. Field of the Invention

The present invention relates to a rangefinder apparatus and a camera equipped therewith.

2. Related Background Art

A rangefinder apparatus of a camera equipped with an AF sensor of passive type or the like captures an object by a pair of left and right line sensors, for example, so as to acquire left and right sensor images (AF data). A pair of window areas for acquiring a pair of AF data items used for correlation value computing from the AF data obtained by the pair of left and right line sensors are determined, and a pair of AF data items used for correlation value computing are successively acquired while shifting the pair of window areas in opposite directions within a pair of predetermined sensor regions (employed sensors). Alternatively, one of the window areas is fixed, and a pair of AF data items used for correlation value computing are successively acquired while shifting the other window area.

The correlation of thus obtained pair of AF data items is determined, and the object distance is computed according to the shift amount of window areas at the time of yielding the highest correlation (at the time when left and right sensor images within a pair of employed sensors coincide with each other) Specifically, the shift amount of window area yielding the highest correlation is a shift amount at which the correlation value attains a minimum value Though there may be cases where the highest correlation is obtained when the correlation value is at a maximum value depending on the method of computing correlation values, this specification explains a case where the highest correlation is obtained when the correlation value is at a minimum value. There are cases where a plurality of local minimum values exist. In such a case, the shift amount yielding the absolute minimum value is usually determined to be the shift amount with the highest correlation.

Japanese Patent No. 2707569 discloses the following rangefinder apparatus. The rangefinder apparatus adopts the first correlation local minimum value detected by shifting the window areas, and the reliability of the correlation local minimum value is determined according to the symmetry of the ratio of change in correlation value before and after the correlation local minimum value. A new local minimum value is obtained by interpolation from respective correlation values of shift positions before and after the correlation local minimum value, and the solution yielded by dividing the new minimum value by the higher ratio of change in the correlation values before and after the local minimum value is compared with a predetermined value, so as to determine the reliability of the new local minimum value.

SUMMARY OF THE INVENTION

When the initially chosen correlation local minimum value is determined to have a reliability by the two determination methods in the above-mentioned rangefinder apparatus, however, this correlation local minimum value is selected as data forming a basis for calculating the distance. Therefore, when a repeating pattern as shown in FIG. 10 is subjected to rangefinding, an initial local minimum value is adopted even though two local minimum values exist in shift regions 1 and 2, respectively, as depicted.

When it is determined to have a reliability since the ratio of change in correlation value around the initial shift position (area including a shift amount C1) has a predetermined degree of symmetry and the new local minimum value obtained by interpolation is at a reference value or lower as shown in FIG. 11, the correlation value computing does not reach an area where the absolute minimum value is supposed to exist (an area including a shift amount B1), and the initial shift position C1 is employed, whereby the rangefinding is in error.

As a technique for securing a reliability in the shift amount obtained, correlation value computing may be carried out in the whole region including the outside of a predetermined area, and the case where the shift amount exhibiting the highest correlation is on the outside of a predetermined area (e.g., area where the shift amount becomes smaller than that at infinity) may be determined to have a low reliability and considered to be a rangefinding error.

The window ranges are not shifted continuously but discretely, so that resulting correlation value data become discrete data. Therefore, even when a certain correlation value is determined to be the smallest local minimum value, it may differ from the true smallest local minimum value B as shown in FIG. 12. Hence, when a plurality of correlation local minimum values exist, the local minimum value C that should not be employed may be employed as the smallest local minimum value. Reliability of measurement is determined according to the shift amount C1 yielding the erroneous smallest local minimum value as shown in FIG. 12, where a rangefinding error is determined according to the shift amount B1 being considered normal. In the shift amount relationship shown in FIG. 13, by contrast, the rangefinding result to be originally determined normal according to the shift amount B1 is found to be a rangefinding error according to the shift amount C1.

For overcoming the problem mentioned above, it is an object of the present invention to provide a rangefinder apparatus which can suppress misjudgment of rangefinding errors, and a camera equipped therewith.

In view of the above-mentioned problem, the present invention provides a rangefinder apparatus comprising: AF data generating means for forming an image of light from an object to be subjected to rangefinding onto a pair of line sensors each including a plurality of light-receiving elements, and generating AF data for calculating a correlation value according to signals obtained from the light-receiving elements; AF data acquiring means for acquiring the AF data from a pair of employed sensor areas used for rangefinding in the pair of line sensors; correlation value computing means for determining a pair of window areas for selecting the AF data to be used for computing a correlation value within the pair of employed sensor areas, and successively computing correlation values while shifting the pair of window areas; interpolated correlation extreme (local minimum) value computing means for detecting at least one correlation extreme (local minimum) value from the correlation values computed by the correlation value computing means, and interpolating the correlation values so as to compute an interpolated correlation extreme (local minimum) value for each correlation extreme (local minimum) value; highest correlation value detecting means for detecting the highest correlation value exhibiting the highest correlation based on the interpolated correlation extreme (local minimum) value(s) computed by the interpolated correlation extreme (local minimum) value computing means; shift amount computing means for computing a shift amount of the window areas when the correlation of the window areas becomes highest; rangefinding error judging means for judging the validity of the shift amount computed by the shift amount computing means depending on whether the shift amount is outside of a predetermined range or not; and object distance calculating means for calculating a distance to the object according to the shift amount computed by the shift amount computing means.

The "AF data" in the present invention include the light intensity data obtained from respective light-receiving elements and the data obtained by processing the light intensity data. Such data processing includes contrast extraction processing that is described in detail hereinafter.

In the case where a plurality of local minimum values of correlation values exist, even when there is an local minimum value outside of a predetermined area, the rangefinder apparatus of the present invention carries out interpolation computing for all the local minimum values and compares the plurality of local minimum values according to interpolated correlation values, whereby erroneous highest correlation values are less likely to be employed. Therefore, misjudgment of range finding errors in which those which are not rangefinding errors are mistaken as rangefinding errors and those which are rangefinding errors are mistaken as normal can be suppressed even in the case where rangefinding errors are determined according to the shift amount yielding the highest correlation value.

The present invention provides a camera equipped with the above-mentioned rangefinder apparatus. When a camera is equipped with a rangefinder apparatus which can suppress the misjudgment of rangefinding errors, it can restrain an unintended distance from coming into focus and rangefinding errors from being found more than necessary.

BRIEF DESCRIPTION OF THE DRAWINGS

FIG. 5 is a flowchart of processing for calculating a distance;

FIGS. 10 to 13 are explanatory charts for explaining the prior art.

DESCRIPTION OF THE PREFERRED EMBODIMENTS

In the following preferred embodiments of a case where the rangefinder apparatus in accordance with the present invention is employed in a camera will be explained in detail. Here, constituents identical to each other will be referred to with the same numeral without repeating their overlapping descriptions.

Figure 1:
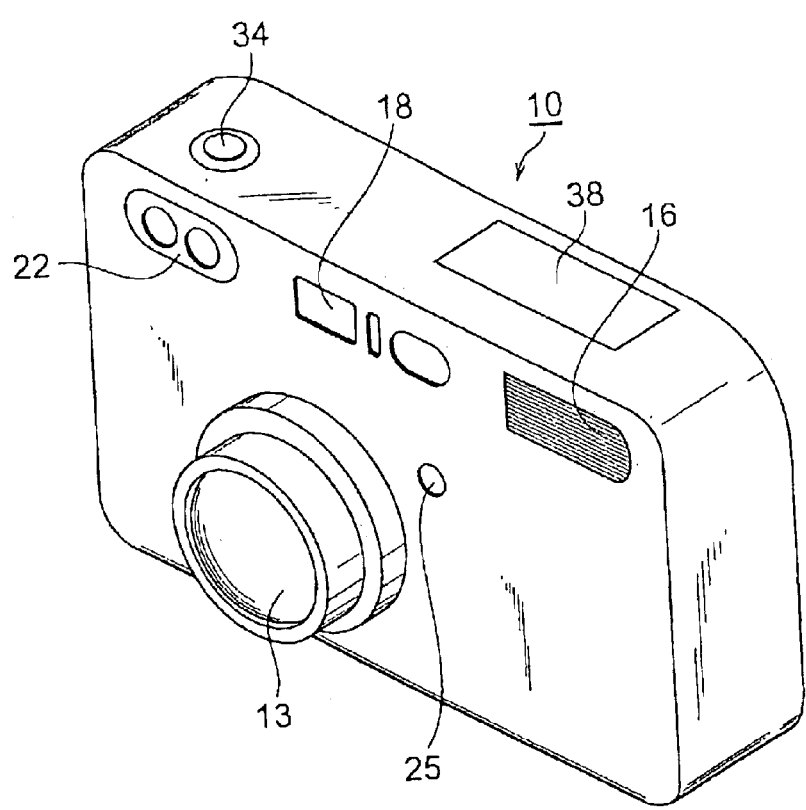
FIG. 1 is a front perspective view of a camera employing the present invention.

FIG. 1 is a front perspective view showing the configuration of a camera employing the present invention. As depicted, this camera 10 is provided with a zoom lens barrel 13 including a taking lens for forming an object image onto a silver halide film, a flash window 16 for flashing, a finder window 18 for a photographer to see the object, an AF window 22 incorporating therein an AF sensor of passive type for measuring the object distance, a photometric window 25 incorporating therein a photometric sensor for measuring the brightness of the object, a shutter button 34 to be operated by the photographer when ordering a shutter release, and the like.

Figure 2:
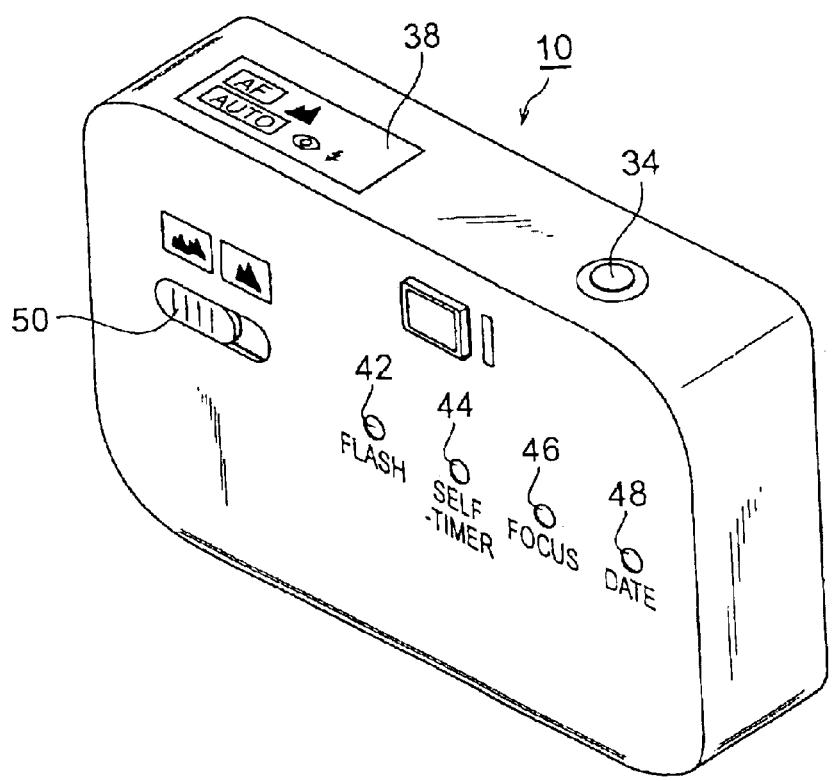
FIG. 2 is a rear perspective view of the camera employing the present invention.

FIG. 2 is a rear perspective view of the camera 10. As depicted, the camera 10 is provided with an LCD panel 38 for displaying a taking mode which is set, date information, and the like; a flash button 42 for setting a flashing mode of the flash; a self-timer button 44 for setting a mode of a self-timer; a focus button 46 for setting a focus mode; a date button 48 for setting date and time; and a zoom button 50 for selecting the taking angle of view between wide and tele directions.

Figure 3:
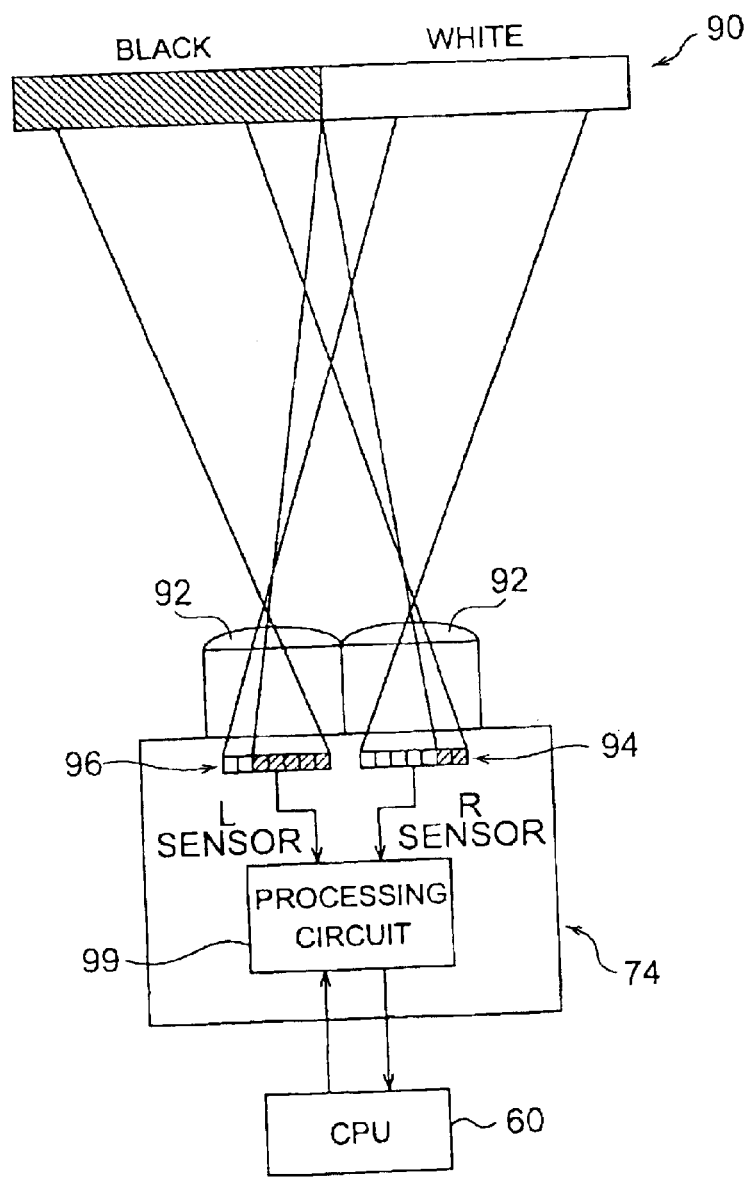
FIG. 3 is a diagram showing the configuration of an AF sensor of passive type.

FIG. 3 is a diagram showing the configuration of the AF sensor 74 (AF data generating means) of passive type. As depicted, the AF sensor 74 is provided with a lenses 92 for forming an image of an object 90 constituted by two colors of white and black, for example, onto a light-receiving surface of each of right and left sensors; an R (right) sensor 94 on the right side and an L (left) sensor 96 on the left side, each photoelectrically converting the image formed on the light-receiving surface into a luminance signal and outputting thus obtained signal; and a processing circuit 99 (AF data acquiring means) for exchanging various kinds of data with the CPU 60, controlling the R sensor 94 and L sensor 96, and carrying out data processing. The R sensor 94, L sensor 96, and processing circuit 99 are implemented on the same substrate, for example.

Each of the R sensor 94 and L sensor 96 is a CMOS line sensor, for example, and is constituted by a plurality of cells (light-receiving elements) arranged on a line. Individual cells in each of the R sensor 94 and L sensor 96 are referred to with sensor numbers 1, 2, 3, . . . , 233, and 234 successively from the left side of the drawing. However, 5 cells each from the left and right ends are unused as dummy cells in practice, whereby the effective sensor region ranges from the sensor numbers 6 to 229. The individual cells of the sensors R sensor 94 and L sensor 96 successively output to the processing circuit 99 luminance signals corresponding to their received light quantities in association with their sensor numbers.

In the CPU 60, correlation value computing is carried out between respective sensor images of the R sensor 94 and L sensor 96, an amount of deviation of sensor images yielding the highest correlation is determined, and the distance to the object 90 is calculated (the principle of trigonometric measurement).

Quantitatively, taking account of the gap between the R sensor 94 and L sensor 96, the distance from each sensor to the lens 92, the pitch (e.g., 12 $\mu$m) of each cell in the R sensor 94 and L sensor 96, and the like, the object distance can be calculated from the amount of deviation of sensor images. The amount of deviation of sensor images can be determined by carrying out correlation value computing between the respective sensor images of the R sensor 94 and L sensor 96.

Figure 4B:
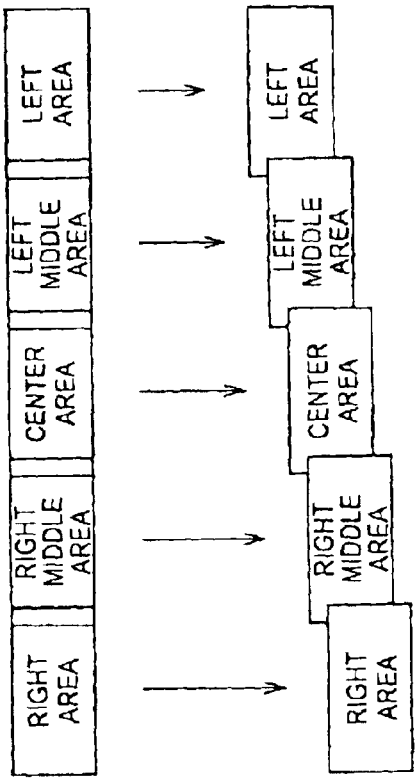
FIGS. 4A and 4B are diagrams showing divisional areas in sensor regions of R and L sensors respectively.
Figure 4A:
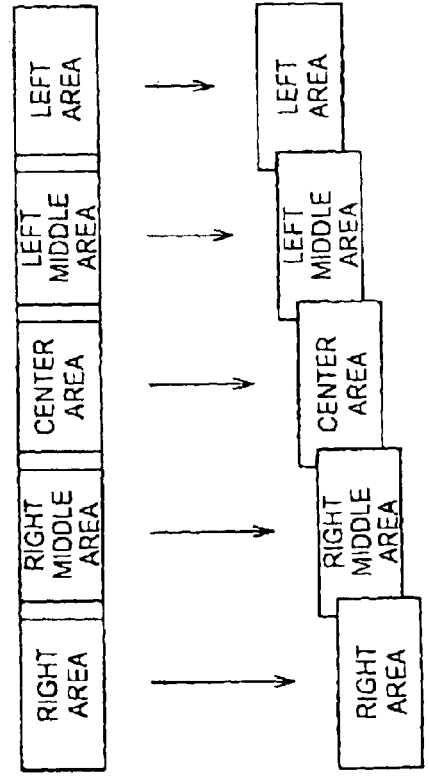

Here, as shown in FIGS. 4A and 4B, 5-divided areas in each of the sensor regions of the R sensor 94 and L sensor 96 are subjected to processing such as correlation value computing, whereby the object distance is calculated in each area. Letting these divided areas be referred to as divisional areas in the following, the divisional areas are constituted by "right area", "right middle area", "center area", "left middle area", and "left area" as shown in the drawings. Each divisional area shares a partial region (cell) with its neighboring divisional areas. At the time of correlation value computing and the like, correlation value computing is carried out individually between corresponding divisional areas (between divisional areas having the same name) of the R sensor 94 and L sensor 96. Though each sensor region is divided into 5 divisional areas in this embodiment, it may be divided into other numbers as well.

A process of calculating the distance to the object by the CPU 60 according to thus acquired AF data will now be explained in detail with reference to the flowchart of FIG. 5

First, at step S10, methods of acquiring AF data (which will be set forth later) are switched in response to the brightness of the object. Namely, in the case where the object has an ultrahigh or high luminance, the sensitivity of AF sensor 74 (gain of luminance signal) is set low. Also, integration processing is carried out individually in the "center area", "left middle area", and "right middle area" constituting the rangefinding area when the rangefinding area is set to 3 areas; and in the "center area", "left middle and left area", and "right middle and right area" constituting the rangefinding area when the rangefinding area is set to 5 areas. Here, the "left middle and left area" refers to the region constituted by "left middle area" and "left area", whereas the "right middle and right area" refers to the region constituted by "right middle area" and "right area". The sensitivity of AF sensor 74 is switchable between two stages of high and low levels.

Here, carrying out integration processing individually in the "center area", "left middle area" (or "left middle and left area"), and "right middle area" (or "right middle and right area") constituting the rangefinding area means that, when the sensor data of any cell within the "center area" reaches the integration terminating value, this sensor data of "center area" is acquired, and the sensor data is subsequently reset so as to start integration; when the sensor data of any cell within the "left middle area" (or "left middle and left area") reaches the integration terminating value, this sensor data of "left middle area" (or "left middle and left area") is acquired, and the sensor data is subsequently reset so as to start integration; and when the sensor data of any cell within the "right middle area" (or "right middle and right area") reaches the integration terminating value, this sensor data of "right middle area" (or "right middle and right area") is acquired. Thus, integration processing is individually carried out in a plurality of regions, whereby, even if sensor data of any region becomes inappropriate because of light having a high luminance incident thereon and the like, effective sensor data can be acquired from other regions.

A process of generating AF data from sensor data in step S10 will now be explained. There are two cases, a case where the individual sensor data outputted from the AF sensor 74 are acquired by an A/D converter circuit, so that thus acquired A/D-converted value of sensor data itself is employed as AF data used in each of subsequent processes in the CPU 60; and a case where sensor data subjected to a predetermined process for improving the accuracy in rangefinding is employed as AF data. In the former case, no particular processing for generating AF data is necessary in the CPU 60, whereby a process of acquiring sensor data becomes a process of acquiring AF data. In the latter case, by contrast, a specific process is carried out for generating AF data in the CPU 60 after the sensor data is acquired. For example, in the latter case, sensor data subjected to contrast extraction can be used as AF data used in each of the subsequent processes. The processing in the case where AF data is generated by subjecting sensor data to contrast extraction will now be explained.

When a cell having a certain cell number (address i) is taken into account, for example, the contrast extraction process is an arithmetic operation for calculating the difference (or ratio) between the sensor data of this cell and the sensor data of a cell having a sensor number (i+m) separated from the former cell by m cells (m pixels). In other words, it is a process for calculating the difference between a sensor data item and a sensor data item shifted therefrom by m pixels in each of the R sensor 94 and the L sensor 96. Namely, letting R(i) be the sensor data of a cell having a sensor number (i) in the R sensor 94, and L(i) be the sensor data of a cell having a sensor number (i) in the L sensor 96, an arithmetic operation of the following expression:

$$R(i)-R(i+m) \quad (1)$$

is carried out for the sensor data of R sensor 94, whereas an arithmetic operation of the following expression:

$$L(i)-L(i+m) \quad (2)$$

is carried out for the sensor data of L sensor 96. Thus obtained differential data indicates the contrast of the sensor image captured by each cell of the AF sensor 74. In this specification, the arithmetic operation for calculating data indicative of the contrast by the sensor data difference of two pixels will be referred to as two-pixel differential operation.

Though the cell gap m of two sensor data items yielding a difference can be set to any desirable value, in this embodiment the cell gap m is set to m=2. Since the electric charge accumulated in a cell having an even sensor number and the electric charge accumulated in a cell having an odd sensor number in the AF sensor 74 are transmitted through respective channels different from each other so as to be processed, it is preferred that the differential data be determined from the sensor data of cells in the same channel. Therefore, m is desirably an even number. Though the number of data items determined by the above-mentioned expressions (1) and (2) decreases by m as compared with the number of data items obtained from the AF sensor 74 in the CPU 60, a necessary number of AF data items can be secured if the data acquiring range is expanded beforehand in view of the decrease by m.

Though the differential data obtained by the above-mentioned expressions (1) and (2) have conventionally been employed as AF data, the differential data having +128 further added thereto are employed as AF data in this embodiment. Namely, letting AFR(i) be the AF data corresponding to the sensor number i of the R sensor 94, and AFL(i) be the AF data corresponding to the sensor number i of the L sensor 96, values obtained by the following expressions:

$$AFR(i)=128+R(i-1)-R(i+1) \quad (3)$$

$$AFL(i)=128+L(i-1)-L(i+1) \quad (4)$$

are employed as AF data when m=2.

Subsequently, in a correlation value computing process (step S12), the CPU 60 calculates a correlation value f(n) (n=−2, −1, 0, 1, . . . , MAX (=38)) according to the AF data acquired by the AF data acquiring process of step S10 in each of the divisional areas constituting the rangefinding areas of R sensor 94 and L sensor 96 of AF sensor 74.

In the correlation value computing process, correlation value computing is carried out between respective sensor images (AF data) taken from the R sensor 94 and L sensor 96 of AF sensor 74, and the amount of deviation between sensor images (shift amount between the right and left AF data) yielding the highest correlation is determined. The distance to the object can be determined from the shift amount between the right and left AF data.

When 3 areas are set as the rangefinding area, correlation value computing is carried out in each of the divisional areas of right middle area, center area, and left middle area. When 5 areas are set as the rangefinding area, correlation value computing is carried out in each of the divisional areas of right area, right middle area, center area, left middle area, and left area.

Figure 6:
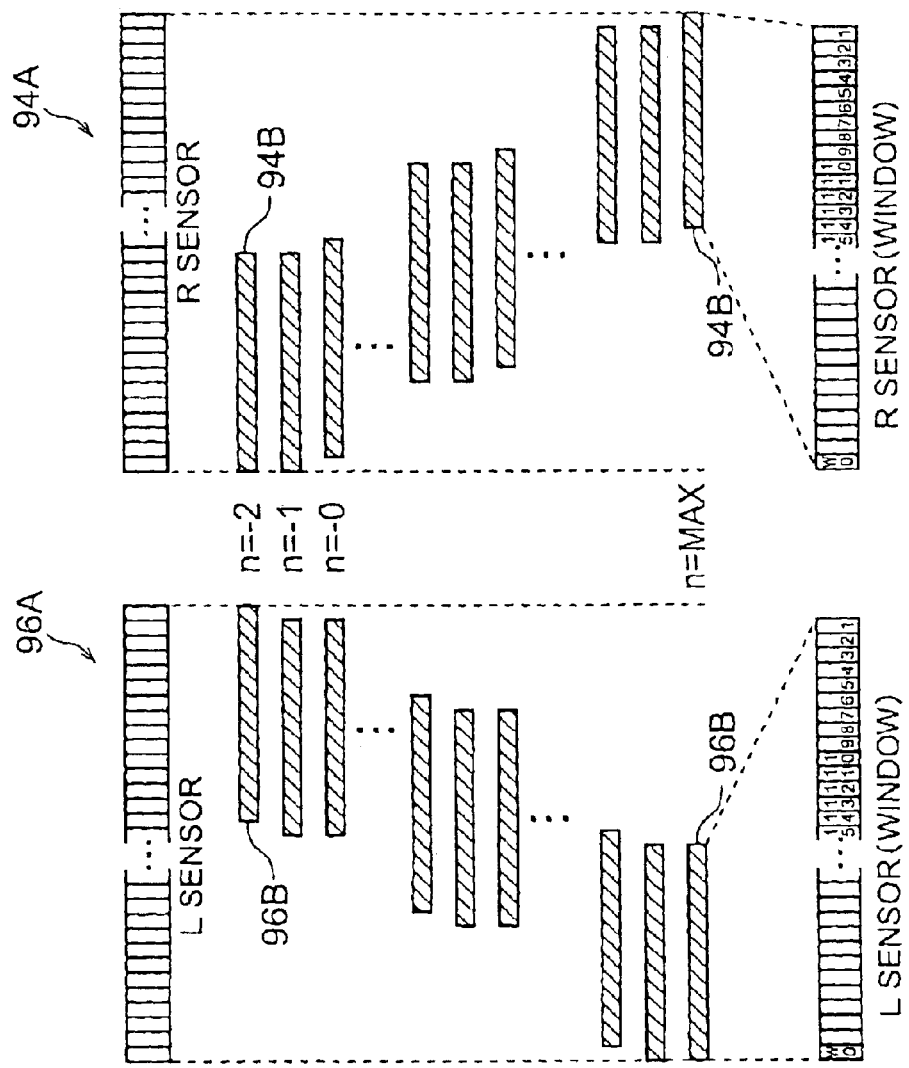
FIG. 6 is an explanatory diagram for explaining correlation value computing.

In FIG. 6, 94A and 96A are sensors of certain divisional areas (hereinafter referred to as "employed sensors") in the R sensor 94 and L sensor 96, respectively. On the other hand, 94B and 96B are R and L window areas for extracting AF data used for correlation value computing from AF data of the employed sensors 94A and 96A, respectively. In the present invention the "window area" or simply the "window" means an area of each employed sensor corresponding to a row of the predetermined number (in this embodiment, such number is represented by "wo") of light-receiving elements that belong to the employed sensor.

Letting n (n=-2, -1, 0, 1, . . . , MAX (=38)) be the amount of shift between the R window 94B and L window 96B, when n=-2, the R window 94B is positioned at the left end of the employed sensor 94A whereas the L window 96B is positioned at the right end of the employed sensor 96A. When n=-1, the L window 96B shifts leftward by 1 cell from the right end of the employed sensor 96A. When n=0, the R window 94B shifts rightward by 1 cell from the left end of the employed sensor 94A. Similarly, the R window 94B and L window 96B alternately move by 1 cell each time n increases by 1. When n=MAX, the R window 94B is positioned at the right end of the employed sensor 94A whereas the L window 96B is positioned at the left end of the employed sensor 96A.

Letting f(n) be the correlation value at a certain shift amount n between the R window 94B and L window 96B, the correlation value f(n) can be represented by the following expression:

$$f(n) = \sum_{i=1}^{wo} |AFL(i) - AFR(i)| \quad (5)$$

where i is the number indicating the position of cell within a window (i=1, 2, . . . , wo (=42)), and AFR(i) and AFL(i) are AF data obtained from the respective cells i that belongs to the R window 94B and L window 96B. Namely, as shown in expression (5), the correlation value f(n) is the sum of absolute values of differences in AF data obtained from the cells at the same cell positions of R window 94B and L window 96B, and is closer to zero as the correlation is higher.

Therefore, when the correlation value f(n) is determined while changing the shift amount n, the distance to the object can be determined from the shift amount n minimizing the correlation value f(n) (yielding the highest correlation). Here, object images are formed on the R sensor 94 and L sensor 96 such that the correlation is the highest when the shift amount n=0 in the case where the object is at infinity, and when the shift amount n=MAX in the case where the object distance is at the near end. Not only the above-mentioned expression (5) but also other arithmetic expressions can be used as an arithmetic expression for determining the correlation. In the latter case, the correlation value may become greater as the correlation is higher. In such a case, the magnitude relation concerning correlation values in the subsequent explanation is reversed. For example, the correlation value yielding the highest correlation becomes the maximum value, whereas statements such as small or large can be employed after being reversed to those of large or small.

Here, for determining local minimum values, the CPU 60 carries out determination of f(n−1)≧f(n)<f(n+1) (step S14), and then further carries out an interpolated value computing process (step S16), so as to detect an interpolated correlation local minimum value.

The interpolated value computing process (step S16) is a process of determining an interpolated correlation local minimum value having a higher accuracy from correlation values f(n) about the detected correlation local minimum value.

Figure 7A:
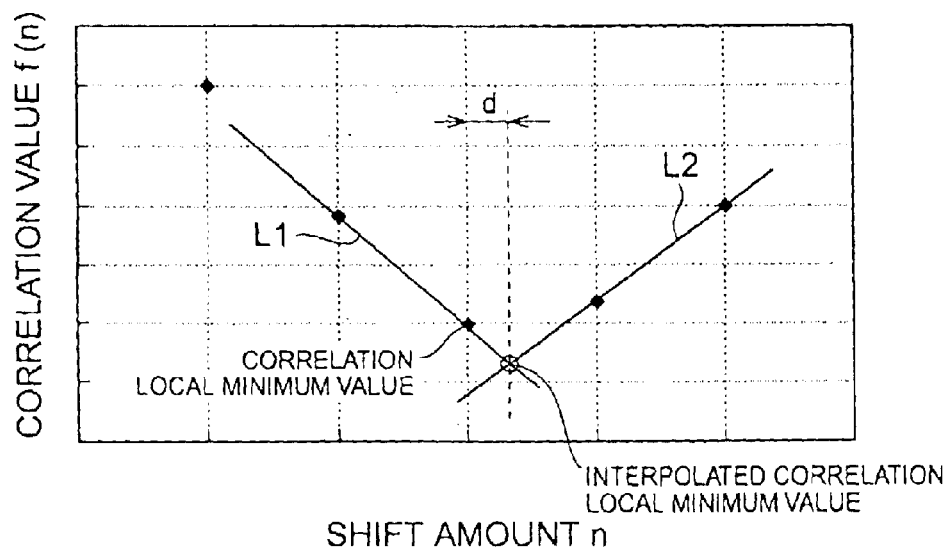
FIGS. 7A and 7B are explanatory charts for explaining interpolation computing.

The CPU 60 carries out the following processing in the interpolated value computing process. Suppose that, with respect to a shift amount nmin yielding a correlation local minimum value f(nmin) in an employed sensor, a correlation value f(nmin−1) of a −1 shift amount nmin−1 and a correlation value f(nmin+1) of a +1 shift amount nmin+1 satisfy the relationship of the following expression:

$$f(nmin-1) > f(nmin+1) \quad (6)$$

as shown in FIG. 7A. In this case, the CPU 60 determines an intersection between a line L1 passing the correlation values f(nmin) and f(nmin−1) of shift amounts nmin and nmin−1, and a line L2 passing the correlation values f(nmin+1) and f(nmin+2) of shift amounts nmin+1 and nmin+2. This intersection is taken as an interpolated correlation local minimum value.

Figure 7B:
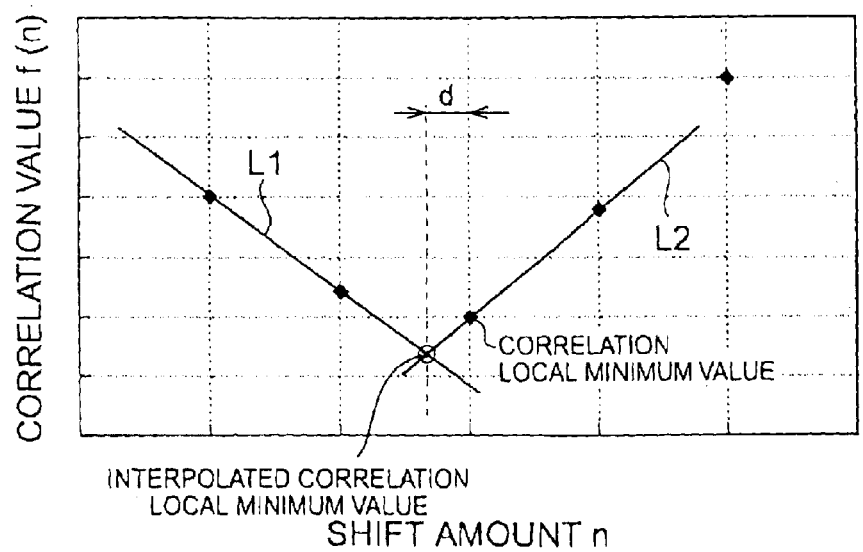

On the other hand, suppose that, with respect to the shift amount nmin yielding the correlation local minimum value, the correlation value f(nmin−1) of the −1 shift amount nmin−1 and the correlation value f(nmin+1) of the +1 shift amount nmin+1 satisfy the relationship of the following expression:

$$f(nmin-1) \leq f(nmin+1) \quad (7)$$

as shown in FIG. 7B. In this case, the CPU 60 determines an intersection between a line L1 passing the correlation values f(nmin−1) and f(nmin−2) of shift amounts nmin−1 and nmin−2, and a line L2 passing the correlation values f(nmin) and f(nmin+1) of shift amounts nmin and nmin+1. This intersection is taken as an interpolated correlation local minimum value.

Subsequently, as the (highest correlation) shift amount yielding the highest correlation, the shift amount n at which the correlation value f(n) attains the smallest interpolated local minimum value is detected (step S18). In many cases, there is only one local minimum value of correlation value (step S20).

On the other hand, there are cases where a plurality of local minimum values exist in the distribution of correlation value f(n) (determination of f(n−1)≧f(n)<f(n+1)). In such a case, a plurality of interpolated correlation local minimum values are calculated. Among the plurality of interpolated correlation local minimum values, the smallest interpolated correlation local minimum value is adopted and the shift amount n of the local minimum value corresponding to the adopted interpolated correlation local minimum value is taken as the highest correlation shift amount n (step S20).

Figure 8A:
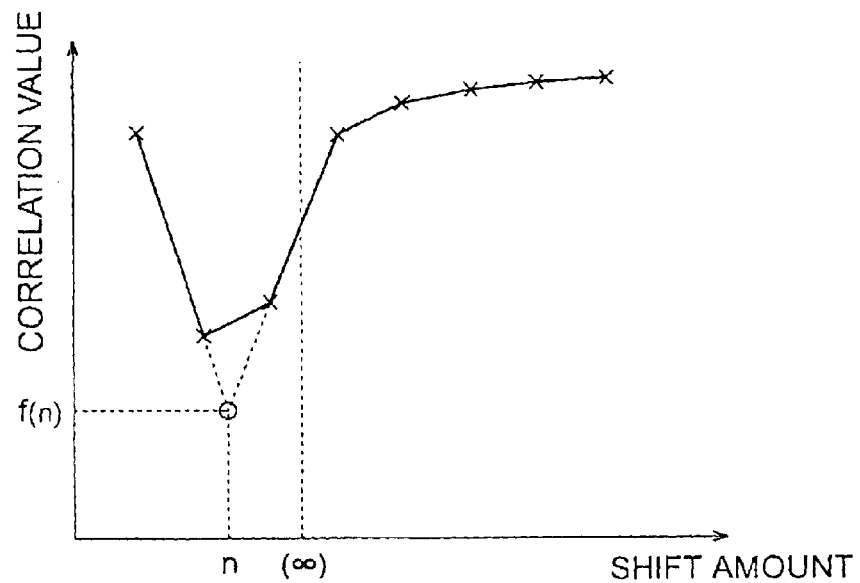
FIGS. 8A and 8B are explanatory charts for explaining rangefinding error determination.
Figure 8B:
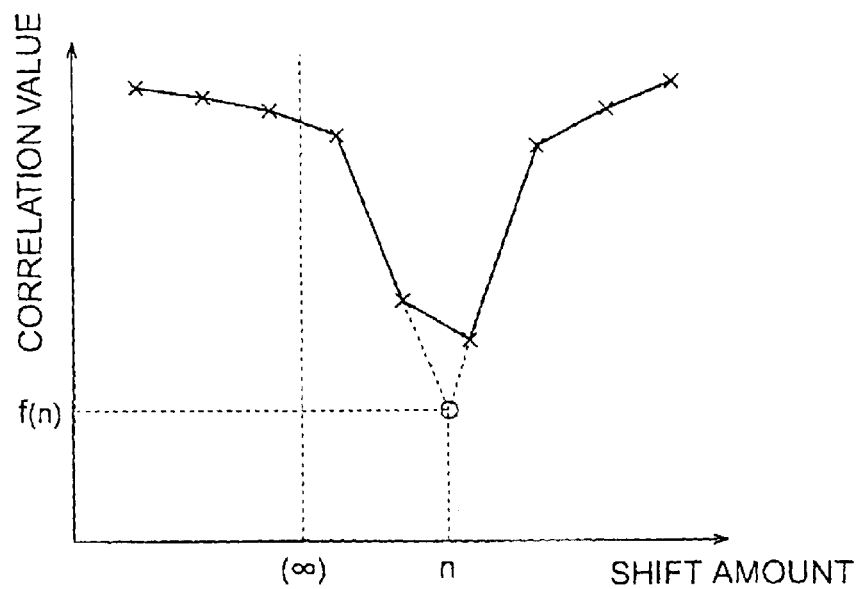

Then, according to thus obtained highest correlation shift amount, it is determined whether the result is reliable or not (rangefinding error determining process (step S22)). If the highest correlation shift amount n obtained by the foregoing falls within an area (outside of a predetermined area) smaller than the shift amount corresponding to infinity (i.e., if the shift amount is −2 or 1) as shown in FIG. 8(a), the highest correlation shift amount is determined to be unreliable, so that the rangefinding is considered to be in error. If not (i.e., if the shift amount n=0 to 38; see FIG. 8(b)), it is determined normal since the highest correlation shift amount is reliable, and a distance calculating process for calculating the distance to the object is carried out according to the highest correlation shift amount. If the shift amount is just that (n=0) corresponding to infinity, it may be determined either normal or a rangefinding error.

A range within which the shift amount can fall is expanded to an area smaller than the shift amount corresponding to infinity, because of the fact that the periodicity of AF data used for determining whether the rangefinding is possible or not cannot be detected unless the shift amount in this area can be recognized. The second reason is that, there are cases where the shift amount may become smaller than the amount corresponding to infinity because of deviations among AF sensors, fluctuation in temperature, and the like, and shift amount in that case has to be recognized. Therefore, the above-mentioned area of shift amount cannot be eliminated, and the case where the calculated result of shift amount falls within this area is considered to be a rangefinding error.

Figure 9A:
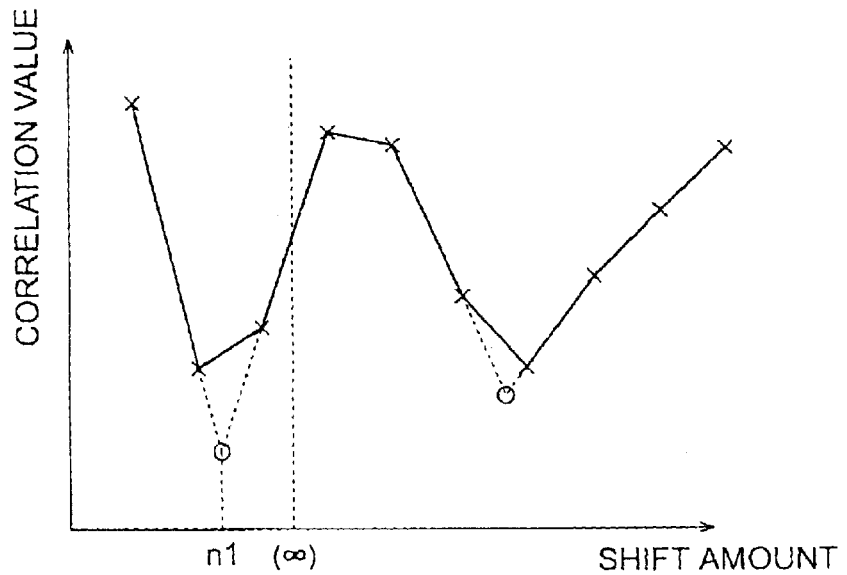
FIGS. 9A and 9B are explanatory charts for explaining rangefinding error determination.
Figure 9B:
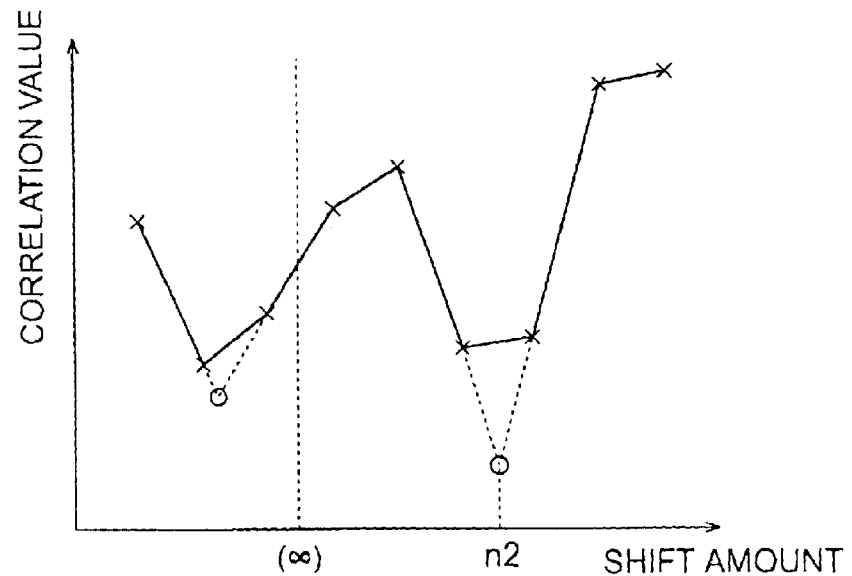
Figure 11:
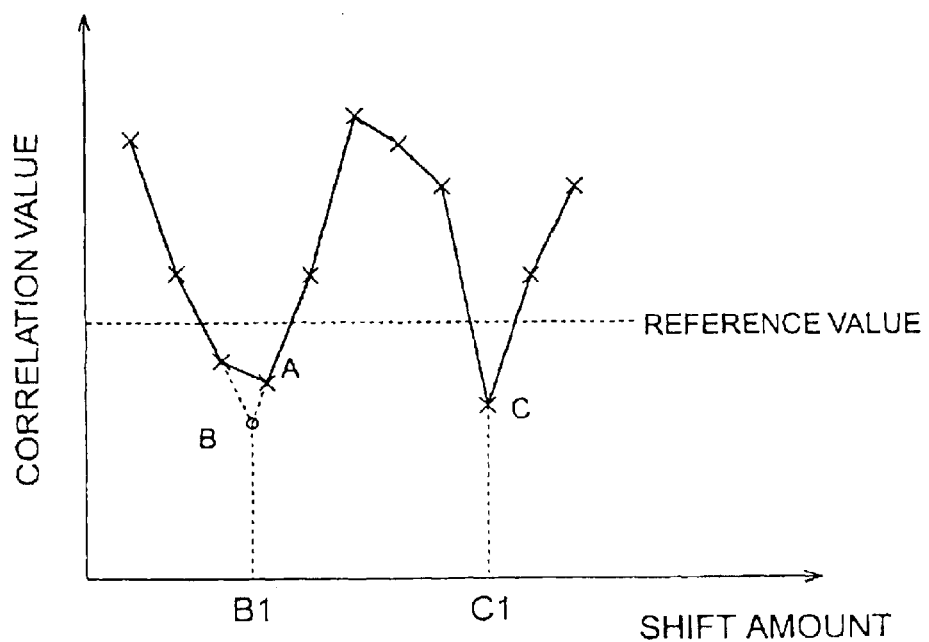
Figure 12:
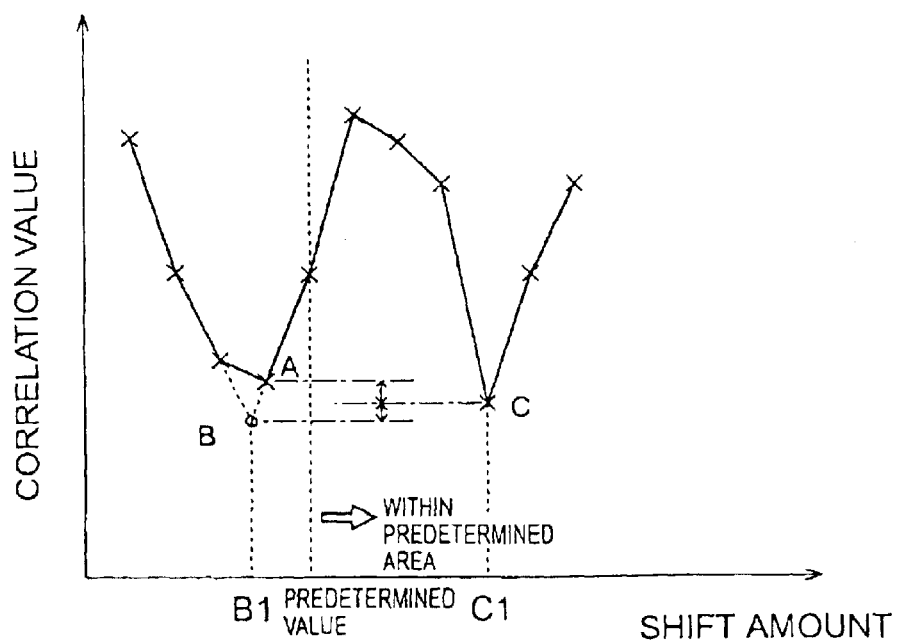
Figure 13:
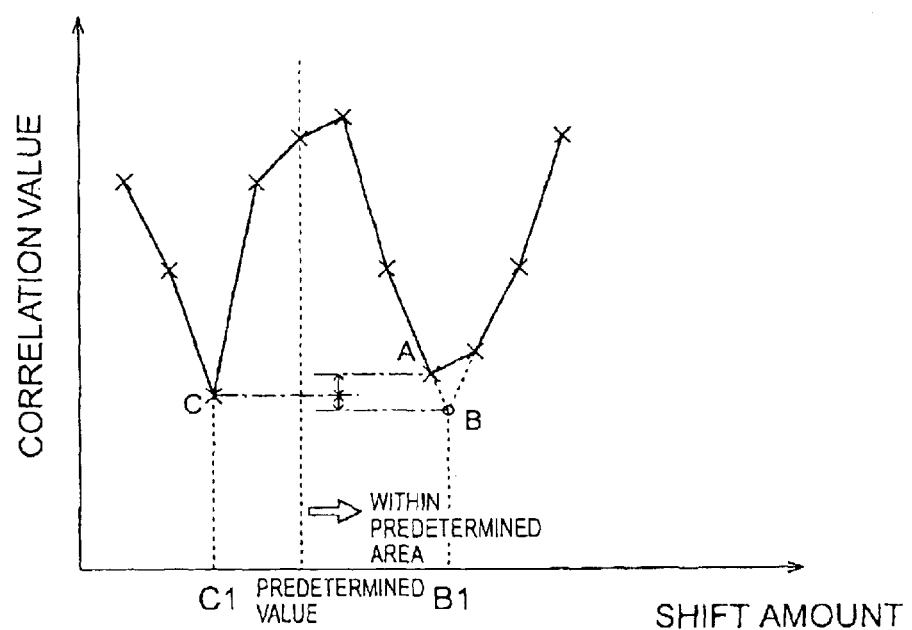

If a plurality of interpolated correlation local minimum values are detected in the interpolated correlation local minimum value detecting process (step S18), the shift amount corresponding to the smallest correlation value is compared with a predetermined value, so as to carry out error determination. For example, the case of FIG. 9A is determined to be a rangefinding error according to a shift amount n1; whereas the case of FIG. 9B is determined to be normal data according to a shift amount n2, so that the flow proceeds to the next step. Though the shift amount corresponding to infinity is used as a criterion for determining a rangefinding error in this embodiment, other predetermined shift amounts may also be used as criteria for determination.

In the distance calculating process, the highest correlation shift amount thus obtained and determined to be appropriate is converted into a distance to the object while taking account of the temperature of outside air and the like, and the resulting distance is taken as the final distance to the object (step S24). Then, the motor is driven so as to move the zoom lens barrel 13 to the position corresponding to this distance, thereby changing the focus position.

The above-mentioned rangefinder apparatus detects the smallest correlation value based on interpolated correlation local minimum values instead of local minimum values of discrete correlation values, whereby erroneous smallest correlation values are less likely to be employed. Therefore, when it is determined whether the rangefinding is in error or not according to the shift amount corresponding to the smallest correlation value, misjudgment of rangefinding errors in which those which are not rangefinding errors actually are mistaken as rangefinding errors and those which are rangefinding errors are mistaken as normal can be suppressed. The camera equipped with this rangefinder apparatus can restrain an unintended distance from coming into focus and rangefinding errors from occurring.

Without being restricted to the above-mentioned embodiment, the present invention can be modified in various manners. For example, though the present invention is applied to a camera of passive AF type in the above-mentioned embodiment, it is also applicable to digital still cameras and video cameras.

What is claimed is:

1. A rangefinder apparatus comprising:

autofocus (AF) data generating means for forming an image of light from an object to be subjected to rangefinding onto a pair of line sensors, each line sensor including a plurality of light detecting elements, and generating AF data for calculating a correlation value according to signals obtained from the light detecting elements;

AF data acquiring means for acquiring the AF data from a pair of employed sensor areas, used for rangefinding, in the pair of line sensors;

correlation value computing means for determining a pair of window areas for selecting the AF data to be used for computing a correlation value within the pair of employed sensor areas, and successively computing correlation values while shifting the pair of window areas;

interpolated correlation extreme value computing means for detecting at least one correlation extreme value from the correlation values computed by the correlation value computing means, and interpolating the correlation values to compute an interpolated correlation extreme value for each correlation extreme value;

highest correlation value detecting means for detecting the highest correlation value exhibiting the highest correlation based on the interpolated correlation extreme value(s) computed by the interpolated correlation extreme value computing means;

shift amount computing means for computing a shift amount of the window areas when the correlation of the window areas becomes highest;

rangefinding error judging means for determining validity of the shift amount computed by the shift amount computing means depending on whether the shift amount is outside of a predetermined range; and object distance calculating means for calculating distance to the object according to the shift amount computed by the shift amount computing means.

2. A camera comprising the rangefinder apparatus according to claim 1.

* * * * *